United States Patent [19]

Hsu

[11] Patent Number: 5,248,554
[45] Date of Patent: Sep. 28, 1993

[54] PROCESS FOR IMPREGNATING FILAMENTS OF P-ARAMID YARNS WITH POLYANILINES

[75] Inventor: Che-Hsiung Hsu, Wilmington, Del.

[73] Assignee: E. I. du Pont de Nemours and Company, Wilmington, Del.

[21] Appl. No.: 891,384

[22] Filed: Jun. 1, 1992

[51] Int. Cl.[5] .................................. B32B 27/34
[52] U.S. Cl. ...................... 428/395; 428/902; 427/353; 427/434.2
[58] Field of Search .............. 427/121, 434.2, 353; 428/395, 902

[56] References Cited

U.S. PATENT DOCUMENTS

| | | | |
|---|---|---|---|
| 3,823,035 | 7/1974 | Sanders | 117/226 |
| 4,025,691 | 5/1977 | Trevoy | 428/411 |
| 4,255,487 | 3/1981 | Sanders | 428/368 |
| 4,545,835 | 10/1985 | Gusack et al. | 156/180 |
| 4,704,311 | 11/1987 | Pickering et al. | 427/393.1 |
| 4,738,757 | 4/1988 | Naarmann | 204/28 |
| 4,803,096 | 2/1989 | Kuhn et al. | 427/121 |
| 4,892,782 | 1/1990 | Fisher et al. | 428/283 X |
| 4,985,046 | 1/1991 | Hartzler | 8/654 |
| 5,073,440 | 12/1991 | Lee | 428/224 |
| 5,093,439 | 3/1992 | Epstein et al. | 525/540 |

*Primary Examiner*—Michael Lusignan

[57] ABSTRACT

Filaments of p-aramid yarns are impregnated with a polyaniline by passage through a polyaniline/sulfuric acid bath.

6 Claims, 1 Drawing Sheet

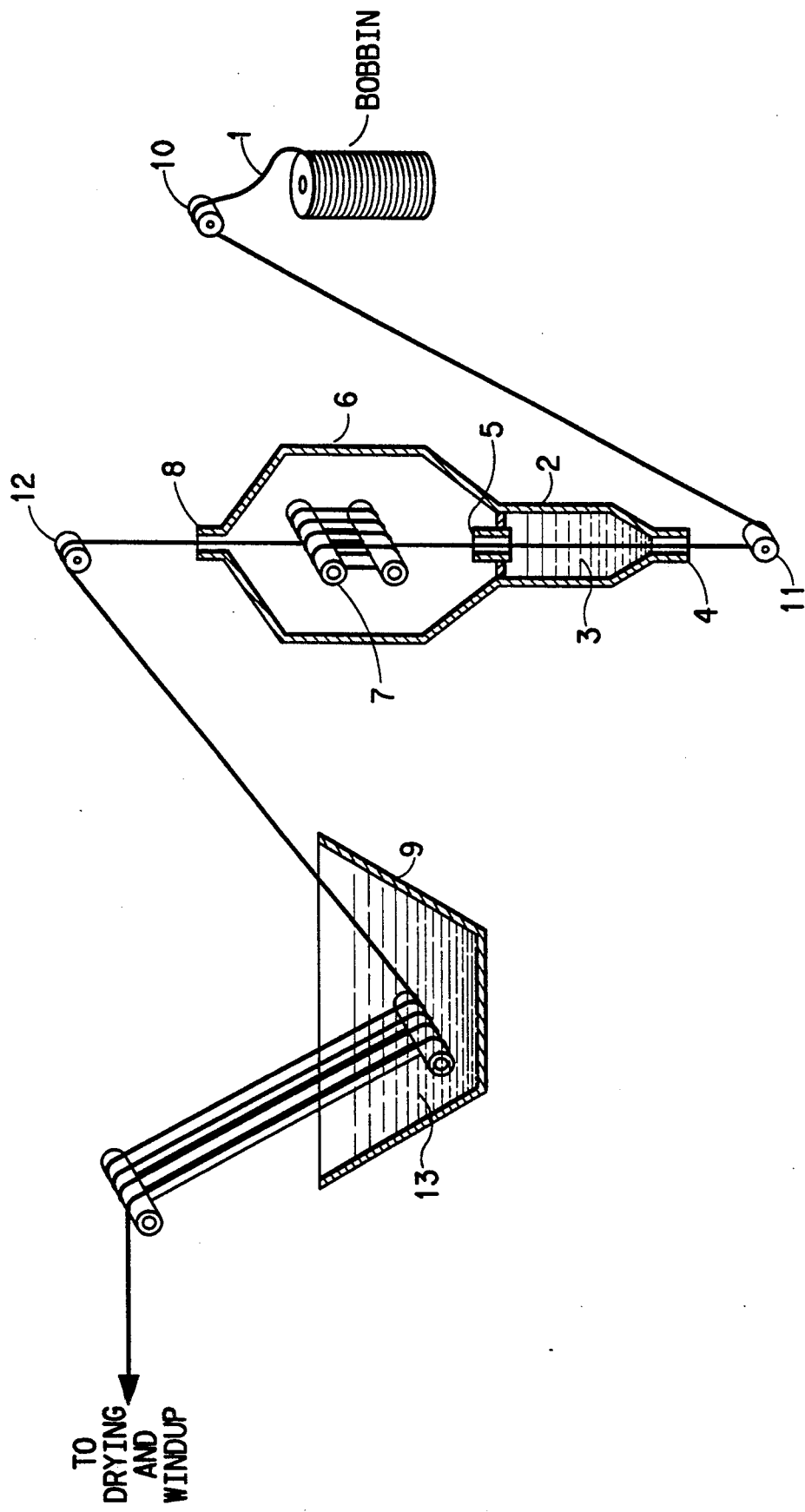

PROCESS FOR IMPREGNATING FILAMENTS OF P-ARAMID YARNS WITH POLYANILINES

BACKGROUND OF THE INVENTION

High performance yarns of p-aramid, i.e., having high strength and high modulus, are well known and accepted in many end-use applications. For certain applications it is desirable that the yarn be electrically conductive. While polyaniline is known to be conductive in the doped form it has not been made into filaments approaching the strength of p-aramid yarn. Attempts to impart electrical conductivity to the p-aramid yarn by deposition of a polyaniline presents formidable obstacles. First, there is the problem of non-uniform deposition. Then there is the problem of lack of permanency, that is, the deposited material may flake off in use. In addition, there is concern that only the outer filaments of the yarn will be treated and that any polyaniline which does penetrate the yarn, will cause the filaments to stick to each other and interfere with subsequent use of the yarn. The process of the invention provides a solution to these problems. Electrically conductive p-aramid yarn is useful as a high frequency energy absorber and as a provider of antistatic protection.

THE FIGURE

The FIGURE shows the sequence of steps in a process for impregnating filaments of p-aramid yarn with a polyaniline.

SUMMARY OF THE INVENTION

This invention provides a process for impregnating filaments of p-aramid yarns with a polyaniline comprising, passing p-aramid yarn through a solution of from 1 to 10% preferably from 1 to 5% by weight of the polyaniline in sulfuric acid of a concentration of from 70 to 87 weight %, at a temperature of from 10° C. to 50° C. for a time sufficient for the polyaniline to impregnate the filaments of the yarn and washing the yarn with water to remove the acid from the yarn. To enhance electrical conductivity of the yarn, the impregnated yarn is contacted with an acid to completely dope the polyaniline.

Also provided is a process for preparing electrically conductive yarns of p-aramid filaments impregnated with a sulfonated polyaniline comprising passing the p-aramid yarn through a solution of a sulfonated polyaniline in sulfuric acid of a concentration of from 70 to 87 weight % at a temperature of from 10° C. to 50° C. for a time sufficient for the polyaniline to impregnate the filaments of the yarn, said solution containing from 1 to 10% preferably from 1 to 5% by weight of the sulfonated polyaniline. The impregnated yarn is washed to remove sulfuric acid from the yarn. The as-prepared yarn contains the self-doped, sulfonated polyaniline in which only a small portion of the impregnated polymer is soluble in 0.1N ammonium hydroxide. The as-prepared yarn optionally may be heat treated to render the impregnated sulfonated polyaniline insoluble in 0.1N ammonium hydroxide solution.

DETAILED DESCRIPTION OF THE INVENTION

The present invention deals with impregnation of the filaments of p-aramid yarn with a polyaniline, the ultimate objective being the production of an electrically conductive, high performance yarn. Two general methods are disclosed, one involving the impregnation with a polyaniline and subsequent doping to enhance conductivity, the other involving impregnation with a sulfonated polyaniline. The latter does not require doping to impart conductivity.

As multifilament p-aramid yarns, there may be used yarns of poly (p-phenylene terephthalamide), (PPD-T) or blends of PPD-T with polyvinyl pyrrolidone (PVP) as disclosed in U.S. Pat. No. 5,073,440. Commercially available PPD-T yarns range from 55 to 15000 in total denier with individual filaments of from 1.5 to 2.25 denier.

Useful polyanilines include polyaniline itself, poly(methylaniline), poly(2-ethoxyaniline) and sulfonated polyaniline among others. Many are disclosed in U.S. Pat. No. 5,093,439. For treating the yarn, the polyaniline is first dissolved in sulfuric acid. The concentration of the acid must be high enough to swell the fiber and ultimately cause longitudinal cracks therein as disclosed in U.S. Pat. No. 4,985,046. A range of 70 to 87 wt. % $H_2SO_4$ is useful for this purpose. Exceeding the upper limit of the range specified will cause undesirable dissolution of the yarn. The concentration of a polyaniline will range from 1% by weight up to its solubility limit in the acid, preferably from 1 to 5% by weight.

Other variables include the temperature at which the acid solution is in contact with the yarn and the contact time. The interplay between the variables will be well understood by those skilled in the art and may require some adjustments for optimum processing. Contact times of from 1 to 60 seconds are satisfactory. Obviously shorter contact times will permit higher temperatures and/or higher acid concentrations without undue harm to the yarn properties, but may not provide the desired level of impregnation as shown by resistivity measurement. Too long exposure time to the acid can produce excessive cracking of the filaments and cause loss of tensile properties. A polyaniline add-on to the p-aramid yarn of from about 1 to 10 wt. % is generally satisfactory for many electrical conductivity applications.

The FIGURE illustrates one method of practicing the invention. P-aramid feed yarn 1 is drawn off a bobbin and passed over and under pins 10 and 11 upwardly through entrance 4 of tube 2 containing the polyaniline-sulfuric acid solution 3. Entrance 4 is constricted allowing yarn 1 to enter but substantially preventing solution 3, which is quite viscous, from exiting. Yarn 1 picks up a coating of solution 3 as it passes through tube 2 and proceeds through constricted exit 5, which strips excess entrapped solution 3 from the yarn, into chamber 6 which is contiguous with tube 2. Yarn 1 then passes over rolls 7 which spread the yarn ensuring intimate contact of entrapped solution 3 with the filaments of the yarn. A blanket of nitrogen is maintained in both tube 2 and chamber 6 through ports (not shown) to prevent the hygroscopic acid solution from picking up moisture. The yarn entering wash bath 9 is passed repeatedly through the bath to assure thorough washing and after optional further washing is dried and wound up. The use of a drive motor (not shown) located before windup is a convenient way of pulling the yarn through the system.

TESTS AND MEASUREMENTS

Electrical Resistance

Electrical resistance of impregnated yarn is determined as follows: Two pressure contact probes connected to a Keithley electrometer are attached, one centimeter apart, to a section of yarn. The resistance is measured in ohms per centimeter.

Tensile Break Strength and Denier Measurement

Tensile break strength is measured at 10 inch gauge length and 5 inch/min cross-head speed and is reported in pounds. Denier is measured by weighing a 90.0 centimeter length of yarn with a Mettler H35AR balance and multiplying the weight in grams by 10,000.

Inherent Viscosity

Inherent viscosity (IV) is defined by the equation:

$$IV = ln(\text{relative viscosity})/C$$

where C is the concentration (0.05 gram of polymer in 10 ml 96 weight % sulfuric acid) of the polymer solution and relative viscosity is the ratio between the flow times of the polymer solution and the solvent as measured at 30° C. in a capillary viscometer.

The following examples are illustrative of the invention and are not to be construed as limiting.

EXAMPLE 1

Polyaniline was prepared according to the following method. A solution consisting of 134.3 g aniline, 194.4 g of 37 wt. % HCl solution and 1,350 g deionized water were placed in a two-liter jacketed glass reaction vessel under a nitrogen atmosphere. The solution was stirred continuously and cooled by external means to −5° C. An oxidant solution consisting of 155 g ammonium persulfate in 270 g water was added to the reaction vessel at a rate of 1.95 ml/min. Following the addition of the oxidant solution, the reaction mixture was stirred at about −7° C. for 3 days. The reactor contents were then filtered and the collected polymer was slurried and then filtered (twice). The polymer was re-slurried in 0.15N ammonium hydroxide solution and the neutralized polymer was filtered and vacuum dried at 45° C. before being washed three times with 2.0 liters of methanol. The polymer was finally washed with acetone and dried before being stored in a dry box until use. The polymer has an inherent viscosity of 1.3 and is not electrically conductive because neutralization with ammonium hydroxide converted the polyaniline from the conductive emeraldine salt form to the non-conductive emeraldine base form. 2.5 g of the polyaniline was mixed with 164.17 g of 87 wt. % $H_2SO_4$ solution in a capped glass jar and stirred until a solution was obtained.

Poly(p-phenylene terephthalamide) (PPD-T) yarn (1,487 den) was guided up through the constricted end of a vertically mounted plastic syringe tube. The prepared polyaniline solution was added to the syringe tube and maintained under a cover of nitrogen. The upper end of the syringe tube was connected to a plastic enclosure through a 40 mil single hole spinneret which served to strip excess solution from the yarn. The polyaniline-coated yarn leaving the syringe tube was passed through the 40 mil hole into the plastic enclosure, then under nitrogen, over two rollers inside the plastic enclosure before exiting through another 40 mil single hole spinneret at the other end of the plastic enclosure.

The polyaniline-coated yarn was then quenched in a bath with constantly replenished water. The yarn was further washed with water jetted from a finish guide. The yarn tension at this point was only about 80 grams. The low tension was intended to ensure that filaments were individually soaked with the polyaniline-sulfuric acid solution and quenched with water. The quenched yarn was then dried and wound on a bobbin. The yarn wind-up speed was set to allow the yarn to be soaked in the polyaniline/sulfuric acid solution for 20 seconds before being quenched with water. A section of the polyaniline-treated yarn which was washed thoroughly with water, was further treated with 1N HCl aqueous solution and dried.

Filaments of the polyaniline-impregnated yarn are not stuck together. The treated yarn had a break load of 68 lbs vs. 72 lbs for a control (not exposed to concentrated $H_2SO_4$) indicating that the yarn retained high strength. SEM photographs show that the fiber surface is smooth and that each filament has distinct continuous crack lines along the fiber axis. The treated yarn had a denier of 1,511 indicating that it contains 1.6 wt. % polyaniline. Two samples cut from one section of the polyaniline impregnated yarn had resistance of $1.0 \times 10^8$ and $2.0 \times 10^7$ ohm/cm, respectively. The yarn which was further treated with 1N HCl had resistances of $1.2 \times 10^5$ and $3.0 \times 10^5$ ohm/cm (measured on two samples) after being dried with nitrogen for 48 hours. The electrical resistances reported above are much lower than that of the PPD-T control (greater than $1 \times 10^{11}$ ohm/cm).

A small piece (~6 cm) of the polyaniline-impregnated yarn was immersed in 40 ml 0.1M ammonium hydroxide solution for one hour. The fiber turned from green to dark blue upon contact with the $NH_4OH$ solution, indicating that the fiber changed from conductive form to non-conductive form. The fiber stayed blue even after prolonged immersion in deionized water for three hours. The treated-fiber had a resistance greater than $1 \times E11$ ohm/cm ($5.6 \times 10^7$ ohm/cm before the $NH_4OH$ treatment). The ammonium hydroxide treated fiber was then immersed for 30 minutes in 30 ml 1-methyl-2-pyrrolidone (NMP), a good solvent for emeraldine base. Although the NMP turned slightly purple/blue, the fiber remained blue, indicating that the impregnated polyaniline was intimately mixed with the PPD-T polymer of the fiber thereby preventing it from being dissolved in NMP.

COMPARATIVE EXAMPLE

A 1.5 wt. % polyaniline/NMP solution was prepared by mixing 0.6 g of the emeraldine base prepared in Example 1 with 39.4 g NMP for one and half hours. The procedure of Example 1 was followed except that the PPD-T yarn was treated with the polyaniline/NMP solution in place of the polyaniline/$H_2SO_4$ solution. Soak time in the solution was much greater than for Example 1, however, because the coated yarn was not quenched with water after exiting the plastic enclosure. Instead, it was dried in a vacuum oven with flowing nitrogen for 10 hours. The dried, modified yarn is very stiff, indicating that the filaments are being held together by the deposited polyaniline. A small piece (~6 cm) of the modified yarn was placed in NMP. The coated polyaniline came off the PPD-T yarn completely as evidenced by the fact that the fiber returned to its original color. This result shows that the polyaniline did not penetrate into the fiber.

EXAMPLE 2

The synthesis and chemical structure of sulfonated polyaniline is reported by Yue et al. [J. Am. Chem. Soc. 112, 2800 (1990)]. It was made by reacting emeraldine base with fuming sulfuric acid. The procedure described below was used for making sulfonated polyaniline for impregnation of multifilament PPD-T yarn.

Emeraldine base was first synthesized by using a method described by A. G. MacDiarmid, et al. ("Conducting Polymers", L. Alcacer, editor; Reidel publication, Dordrecht, Holland, 1987, P 105). The resulting emeraldine was further washed with methanol until the filtrate was colorless. 0.5 g of the emeraldine base was sulfonated by dissolving it in 40 ml of ~30% fuming sulfuric acid with constant stirring at approximately 5° C. The polymer solution was kept at that temperature for 10 minutes before allowing it to rise to room temperature. After 30 minutes the solution was added over 20 minutes to 200 ml of methanol while the temperature was kept between 10° and 20° C. in an ice bath. The green precipitate which formed was then collected on a Buchner funnel, and washed at least 10 times with 50 ml portions of methanol until the filtrate had a pH of 7. The filter cake was then dried under vacuum for 24 hours.

The procedure described in Example 1 was used for treating PPD-T yarn (1,487 den.) with 5 wt. % sulfonated polyaniline in 87 wt. % $H_2SO_4$. The yarn wind-up speed allowed the yarn to be soaked in the sulfonated polyaniline/$H_2SO_4$ solution for 60 seconds. The treated yarn was washed with deionized water extensively and then dried in air. Filaments of the treated yarn are not stuck together. The treated yarn has a break load of 64 lbs. vs. 72 lbs. for a control. SEM photographs show that the fiber surface was smooth and each filament has distinct, continuous crack lines along the fiber length. The modified yarn has a denier of 1,503, indicating that the fiber contains about 1.1 wt. % sulfonated polyaniline. Two samples which were cut from the modified yarn and dried in air for at least seven days had resistances of $1.2 \times 10^8$ and $0.9 \times 10^8$ ohm/cm respectively. The samples were then immersed for 30 minutes in 40 ml of 0.1M ammonium hydroxide solution, a good solvent for sulfonated polyaniline. The ammonium hydroxide solution turned only slightly purple/blue in color whereas the fiber remained very dark, thereby showing that the impregnated sulfonated polyaniline was intimately mixed with PPD-T polymer preventing it from being dissolved by the $NH_4OH$ solution. Two samples of ammonium hydroxide treated PPD-T yarn were then immersed in water for two hours and dried with nitrogen for 16 hours. The dried samples have resistances of $4.0 \times 10^8$ and $2.5 \times 10^8$ ohm/cm, respectively. Although a small portion of sulfonated polyaniline in the yarn is soluble in 0.1N ammonium hydroxide solution, heating the modified yarn at 110° C. in a vacuum oven under nitrogen flow for one hour renders the impregnated sulfonated polyaniline insoluble in the ammonium hydroxide solution. The heat-treated yarn exhibited a resistance of $2.2 \times 10^7$ ohm/cm.

COMPARATIVE EXAMPLE

The procedure described in Example 1 was followed except that PPD-T yarn was treated with a 2.0 wt. % sulfonated polyaniline/$NH_4OH$ solution. The sulfonated polyaniline coated yarn was not quenched with water after exiting the plastic enclosure. Soak time in the sulfonated polyaniline/$NH_4OH$ solution was 60 seconds. The sulfonated polyaniline coated yarn was dried with flowing nitrogen for 10 hours. A small piece (~6 cm) of the dried, modified yarn was immersed in 0.1M ammonium hydroxide solution. The modified yarn returned to its original color shortly after it was in contact with the solution, indicating that the sulfonated polyaniline did not penetrate into the fiber.

EXAMPLE 3

The procedure described in Example 1 was used for treating PPD-T yarn with 2.0 wt. % sulfonated polyaniline in 87 wt. % $H_2SO_4$ solution. The yarn wind-up speed was set to allow the yarn to be soaked with the sulfonated polyaniline/sulfuric acid solution for 5 seconds. The treated yarn was washed thoroughly with water before being dried in air. Filaments of the treated yarn are not stuck together. Two samples were cut from the treated yarn and further dried in nitrogen for 46 hours. Resistances of the samples are $4.0 \times 10^8$ and $3.5 \times 10^8$ ohm/cm, respectively.

The sulfonated-polyaniline impregnated yarn was immersed in 0.1M ammonium hydroxide solution causing it to turn slightly purple/blue although the fiber remained very dark. The modified yarn was heat treated in a vacuum oven with nitrogen flow at 55° C. for 20 minutes before immersion 0.1M ammonium hydroxide solution. The solution did not turn color. Two samples of the heat-treated yarn have resistances of $5.0 \times 10^8$ and $4.5 \times 10^8$ ohm/cm, respectively.

SI units may be calculated using the following conversion factors:

| FROM | CONVERSION FACTOR | TO (SI UNITS) |
| --- | --- | --- |
| Denier | × 1.11 | dtex |
| in/min | × 2.54 | cm/min |
| mil | × 25.4 | um |
| lb force | × 4.45 | N |

I claim:

1. A process for impregnating filaments of p-aramid yarn with a polyaniline comprising, passing p-aramid yarn through a solution of from 1 to 10% by weight of the polyaniline in sulfuric acid of a concentration of from 70 to 87 weight %, at a temperature of from 10° C. to 50° C. for a time sufficient for the polyaniline to impregnate the filaments of the yarn, and washing the yarn with water to remove the acid from the yarn.

2. A process according to claim 1 wherein the washed yarn is treated with hydrochloric acid to completely dope the polyaniline and to enhance electrical conductivity of the yarn.

3. A process according to claim 1 wherein the polyaniline employed is sulfonated polyaniline.

4. A process according to claim 3 wherein the impregnated yarn is heat-treated to render the impregnated sulfonated polyaniline insoluble in 0.1N ammonium hydroxide solution.

5. A p-aramid yarn that is impregnated according to the process of claim 1.

6. A p-aramid yarn that is impregnated according to the process of claim 3.

* * * * *